United States Patent
Nagao et al.

(10) Patent No.: US 10,650,481 B2
(45) Date of Patent: May 12, 2020

(54) IMAGE PROCESSING DEVICE, IMAGE PROCESSING METHOD, AND NON-TRANSITORY COMPUTER READABLE MEDIUM FOR IMAGE PROCESSING

(71) Applicants: FUJI XEROX CO., LTD., Tokyo (JP); FUJIFILM Corporation, Tokyo (JP)

(72) Inventors: Takashi Nagao, Kanagawa (JP); Kazuyuki Itagaki, Kanagawa (JP); Kosei Takemoto, Kanagawa (JP)

(73) Assignees: FUJI XEROX CO., LTD., Tokyo (JP); FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/781,790

(22) PCT Filed: Jul. 27, 2016

(86) PCT No.: PCT/JP2016/072031
§ 371 (c)(1),
(2) Date: Jun. 6, 2018

(87) PCT Pub. No.: WO2017/163441
PCT Pub. Date: Sep. 28, 2017

(65) Prior Publication Data
US 2018/0365793 A1    Dec. 20, 2018

(30) Foreign Application Priority Data
Mar. 24, 2016  (JP) ................................ 2016-060525

(51) Int. Cl.
*B21K 11/00*     (2006.01)
*B21K 11/02*     (2006.01)
(Continued)

(52) U.S. Cl.
CPC .............. *G06T 1/20* (2013.01); *G06F 9/4881* (2013.01); *G06F 9/50* (2013.01); *G06F 12/0207* (2013.01);
(Continued)

(58) Field of Classification Search
CPC ................. B21K 11/02; G06F 12/0884; G06F 2212/603; G06F 9/4881; G06F 9/50; G06T 1/20; G06T 1/60
See application file for complete search history.

(56) References Cited

U.S. PATENT DOCUMENTS

2011/0050713 A1    3/2011  McCrary et al.
2016/0267622 A1*   9/2016  Brothers .................. G06T 1/20

FOREIGN PATENT DOCUMENTS

JP    4-172570 A    6/1992
JP    8-44678 A     2/1996
(Continued)

OTHER PUBLICATIONS

Command queue—Wikipedia, the free encyclopedia, Jun. 10, 2014. (Year: 2014).*
(Continued)

*Primary Examiner* — Sing-Wai Wu
(74) *Attorney, Agent, or Firm* — Sughrue Mion, PLLC

(57) ABSTRACT

An image processing device executes image processing by each object of an object group in which plural objects are connected to each other in a directed acyclic graph form. The image processing device includes: a division unit that divides image data as an image processing target into division image data having a first size; a subdivision unit that subdivides the division image data into subdivision image data having a second size smaller than the first size for each partial processing which is image processing to be performed on the division image data, the division image data
(Continued)

corresponding to the partial processing which is determined as executable processing based on a pre-and-post dependency relationship; and a control unit that performs control for causing plural computation devices to execute subdivision partial processing which is image processing to be performed on the subdivision image data, in parallel.

16 Claims, 10 Drawing Sheets

(51) Int. Cl.
*G06F 12/0884* (2016.01)
*G06F 9/48* (2006.01)
*G06T 1/20* (2006.01)
*G06T 1/60* (2006.01)
*G06F 9/50* (2006.01)
*G06F 12/02* (2006.01)
*G06F 12/0842* (2016.01)
*G06F 12/0811* (2016.01)

(52) U.S. Cl.
CPC ............ *G06F 12/0884* (2013.01); *G06T 1/60* (2013.01); *G06F 12/0811* (2013.01); *G06F 12/0842* (2013.01); *G06F 2212/1016* (2013.01); *G06F 2212/1048* (2013.01); *G06F 2212/603* (2013.01)

(56) References Cited

FOREIGN PATENT DOCUMENTS

| JP | 2002-251610 A | 9/2002 |
| JP | 4965995 B2 | 7/2012 |
| JP | 2013-504127 A | 2/2013 |

OTHER PUBLICATIONS

CPU Cache—Wikipedia, the free encyclopedia, Dec. 24, 2014. (Year: 2014).*
Igor Belyakov et al., "Deferred Mode Image Processing Framework: Simple and efficient use of Intel® multi-core technology and many-core architectures with Intel® Integrated Performance Primitives", INTEL Developer Zone, Feb. 13, 2010. (26 pages total).
Khronos Group, "The OpenVX Specification", Khronos Vision Working Group, Version 1.0.1, Document Revision: r31169, Genereated on Wednesday, May 13, 2015, [online], [search on Mar. 11, 2016], Internet <URL: https://www.khronos.org/registry/vx/specs/1.0.1/OpenVX_Specification_1_0_1_pdf>. (263 pages total).
Search Report dated Aug. 30, 2016 by the International Searching Authority in counterpart International Patent Application No. PCT/JP2016/072031. (PCT/ISA/210).
Written Opinion dated Aug. 30, 2016 by the International Searching Authority in counterpart International Patent Application No. PCT/JP2016/072031. (PCT/ISA/237).

* cited by examiner

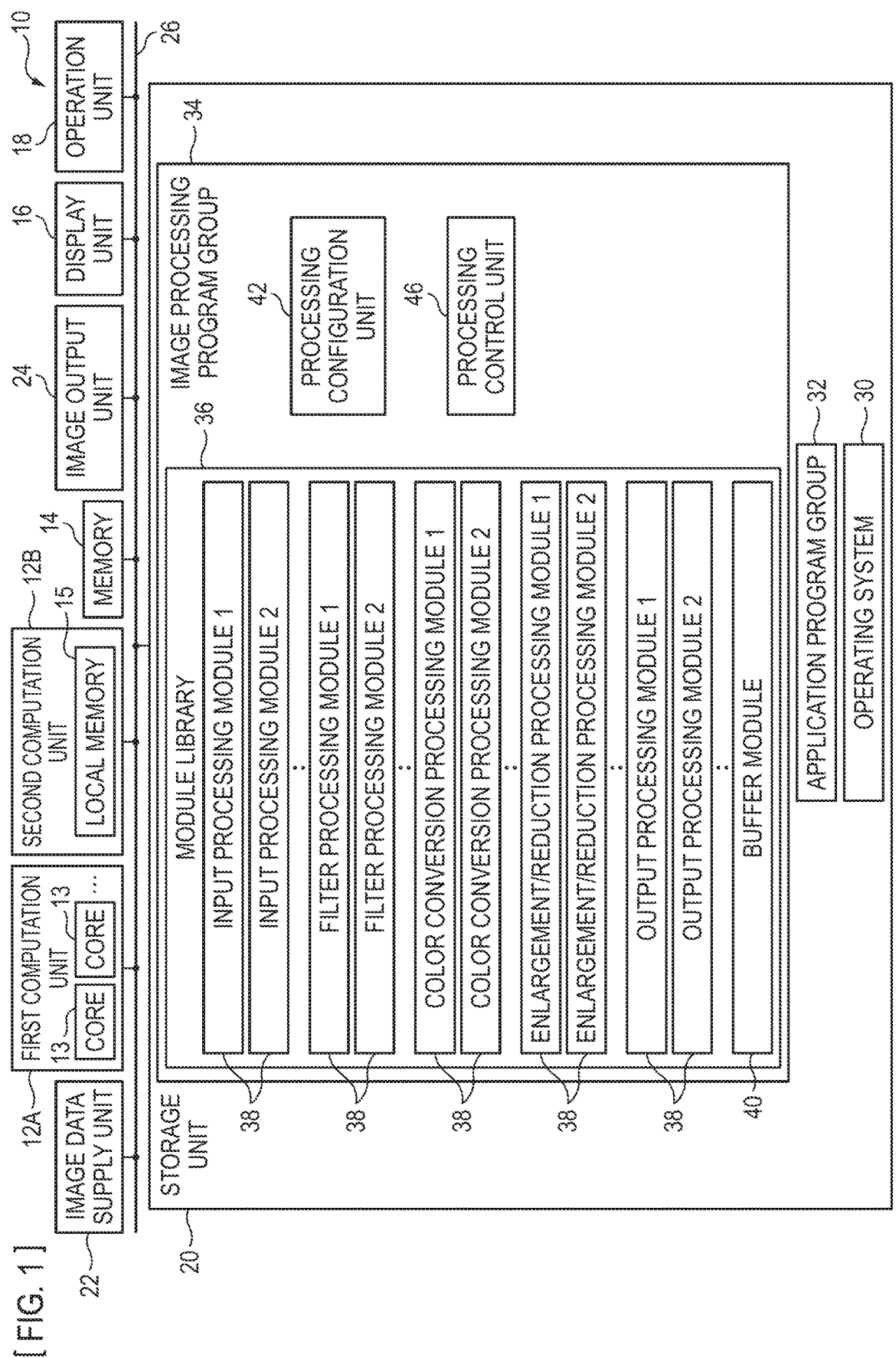

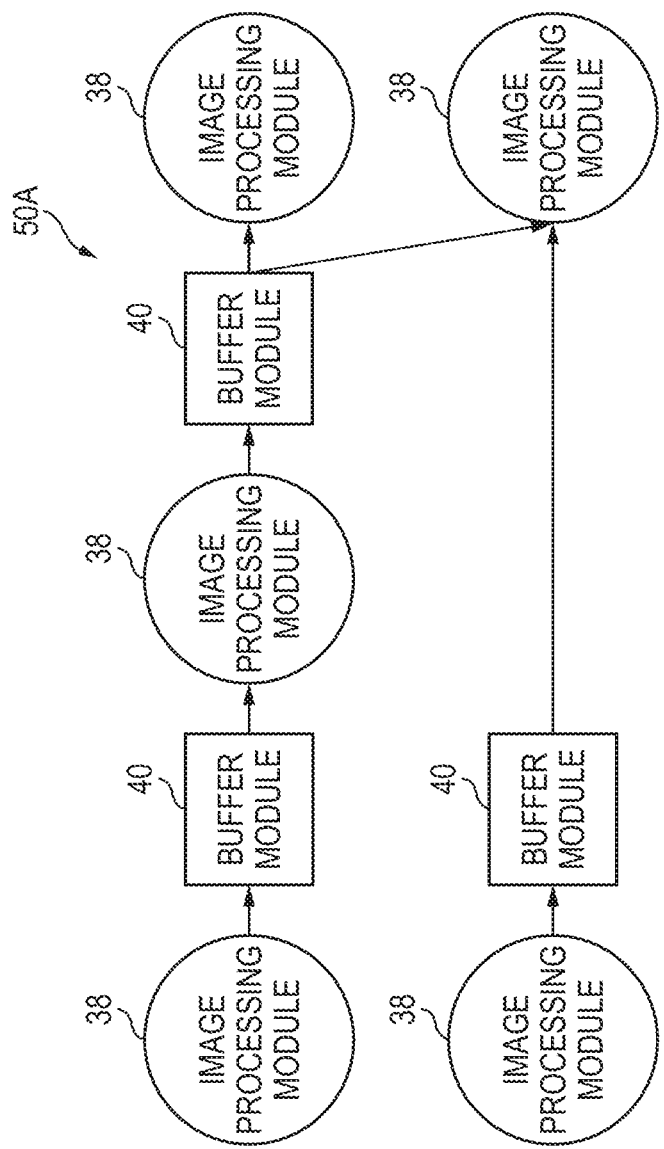
[FIG. 2A]

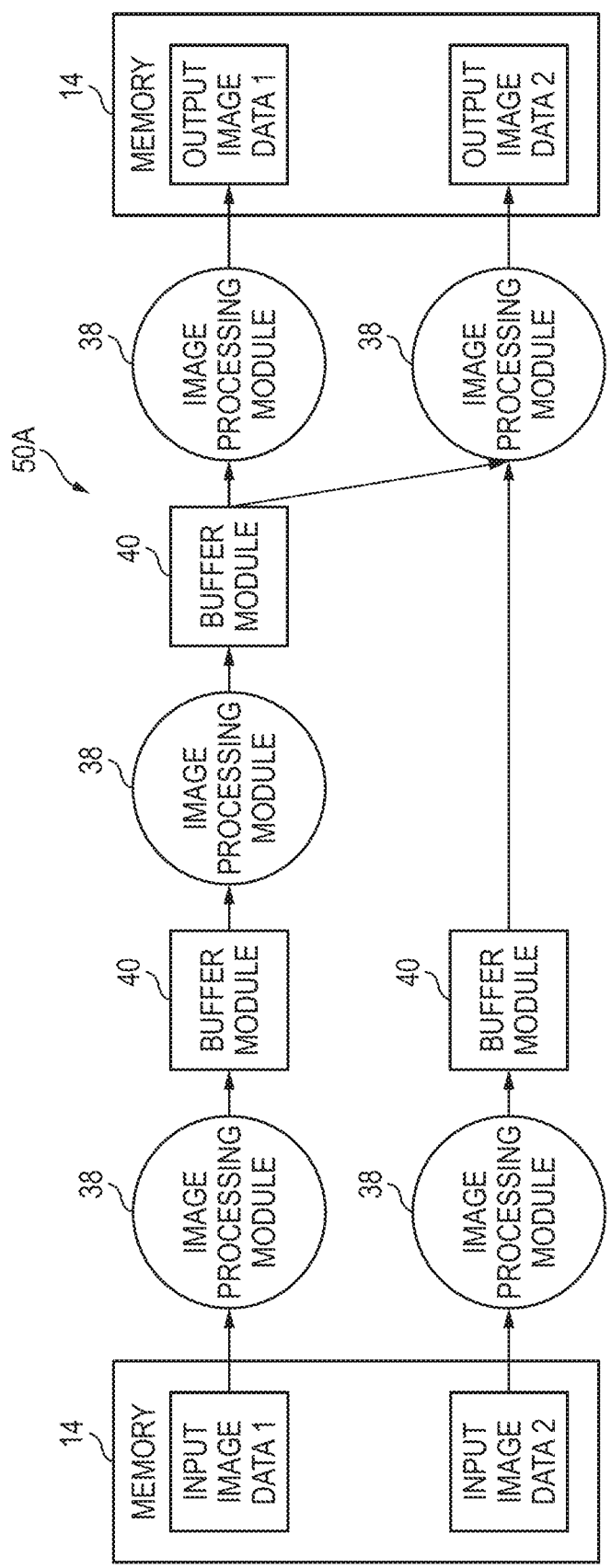
[FIG. 2B]

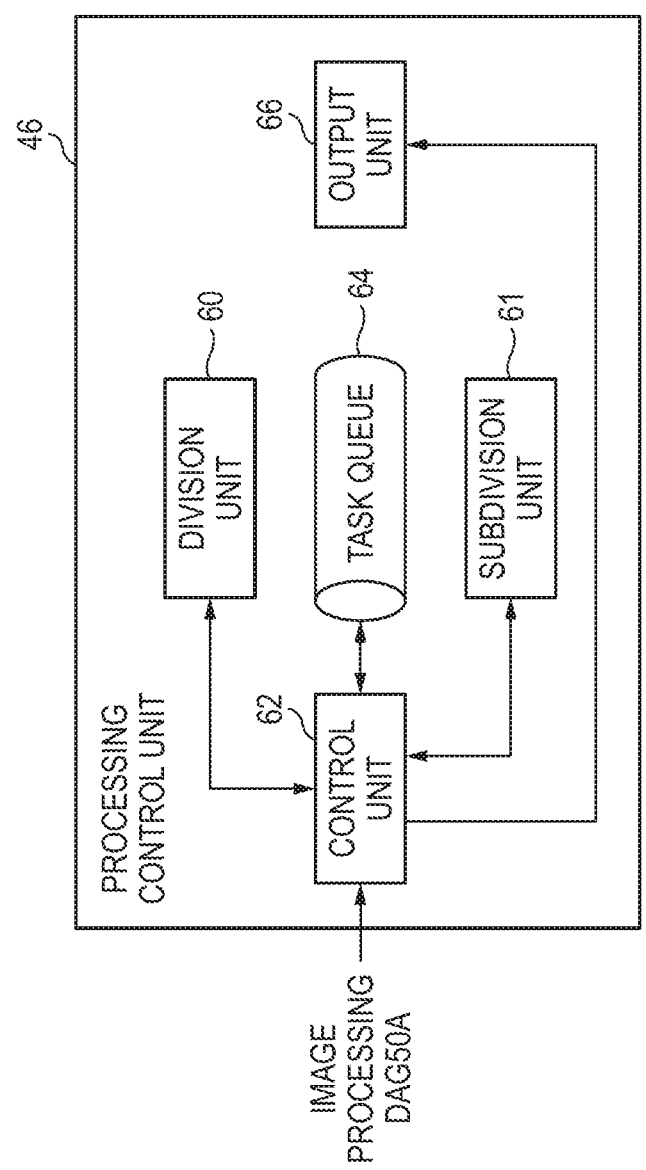
[FIG. 3]

[FIG. 4]
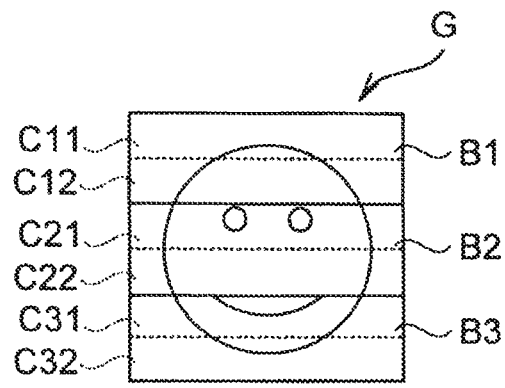
[FIG. 5]
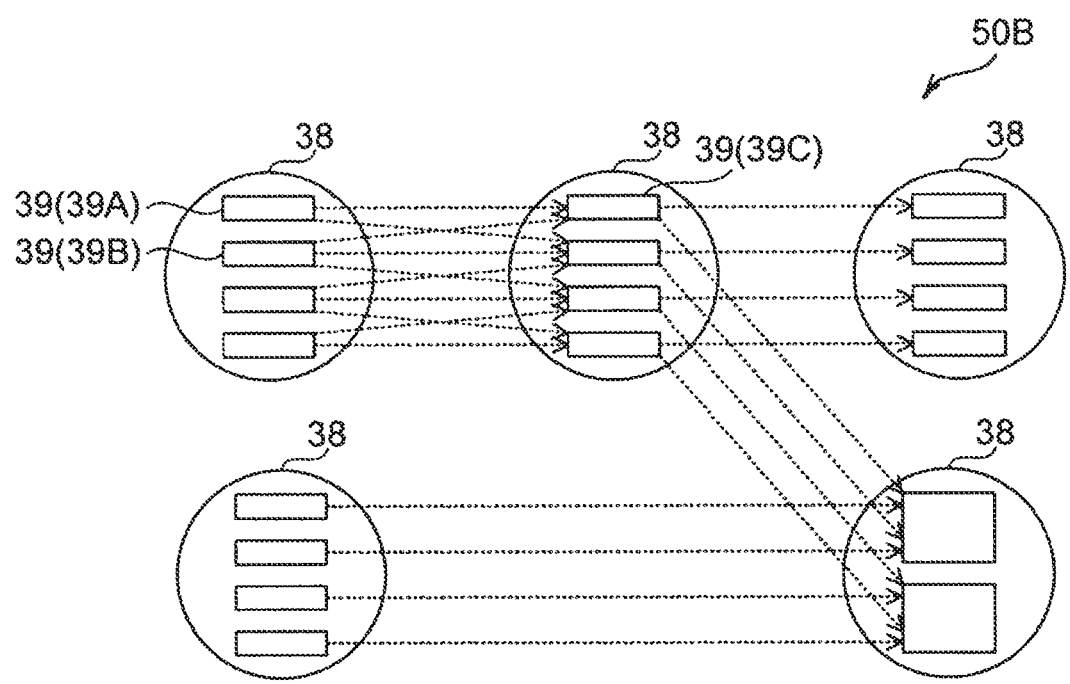

[ FIG. 6 ]
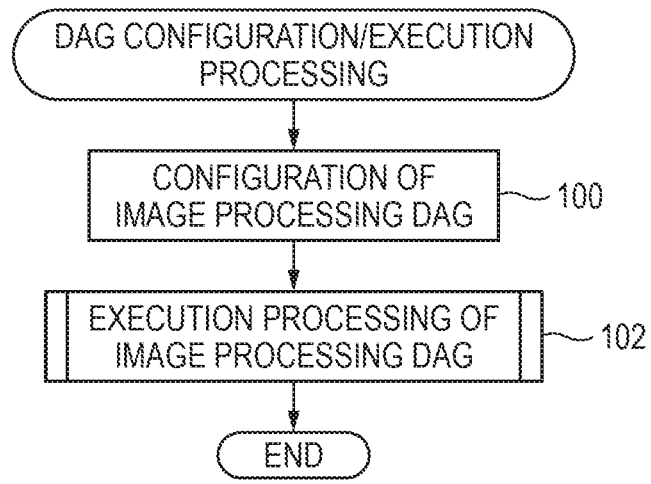
[ FIG. 7 ]
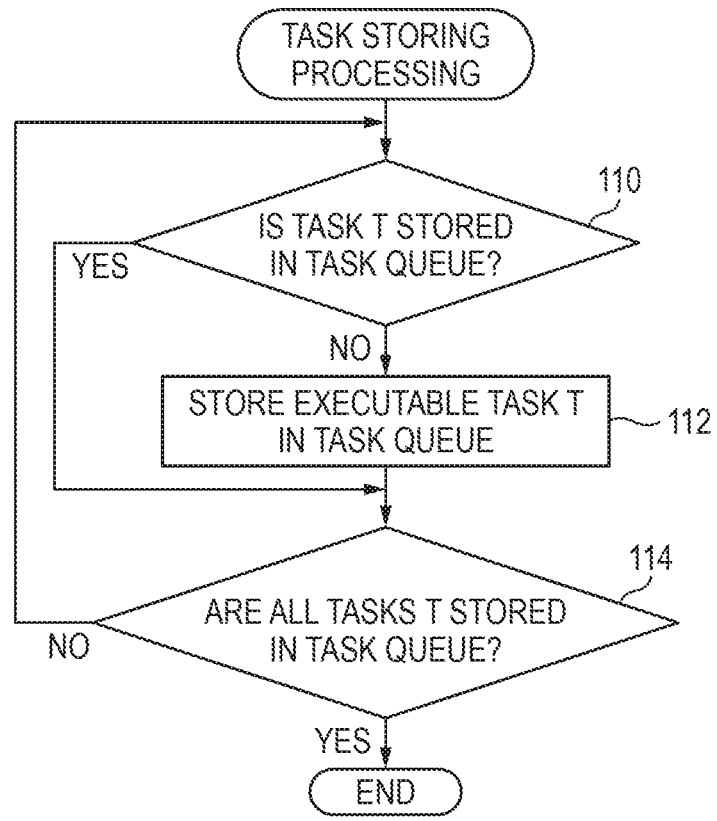

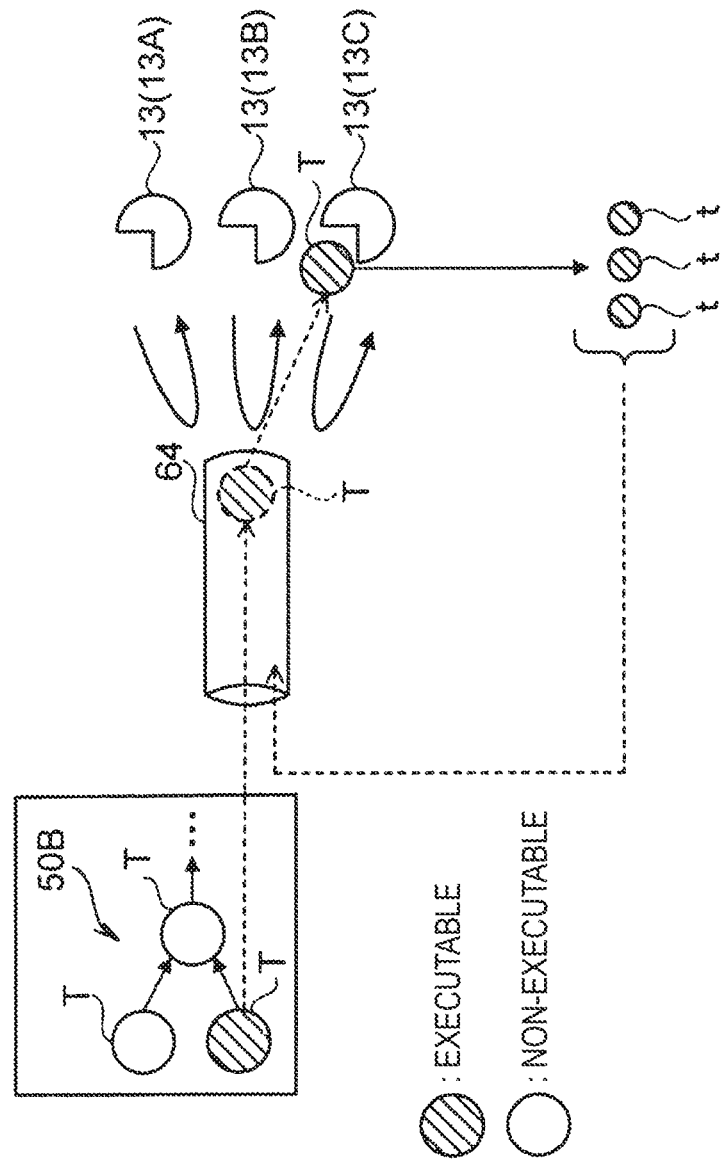

[FIG. 9]
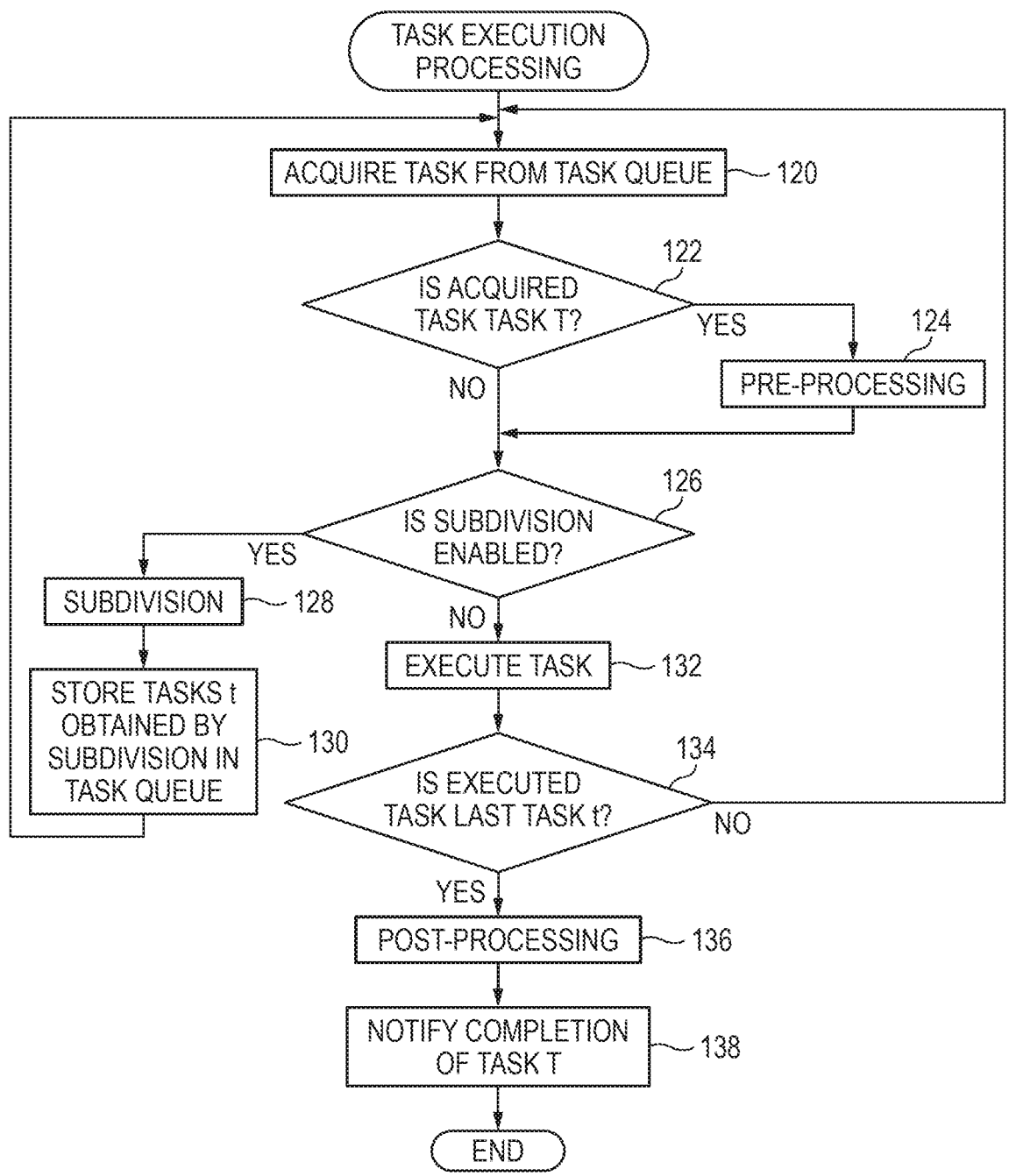

[ FIG. 10A ]
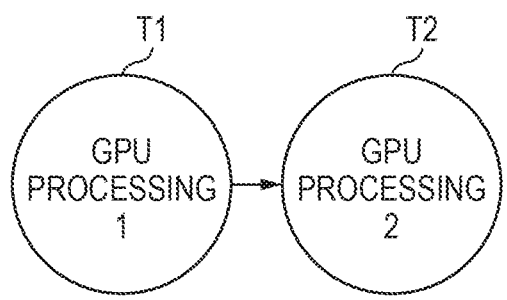
[ FIG. 10B ]
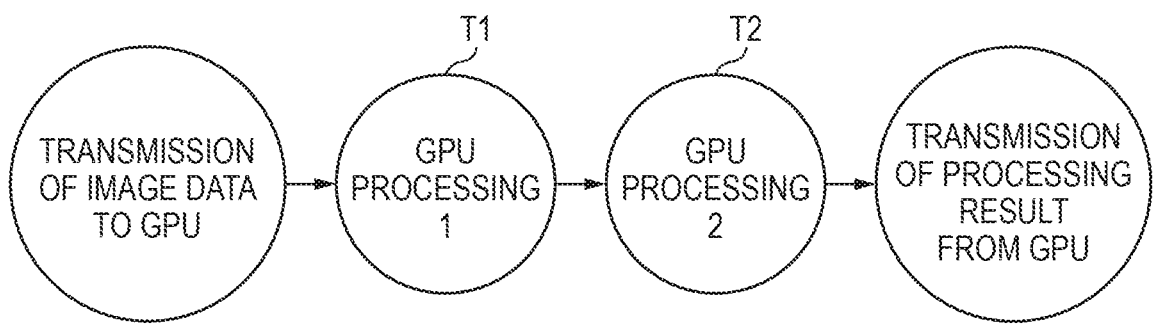

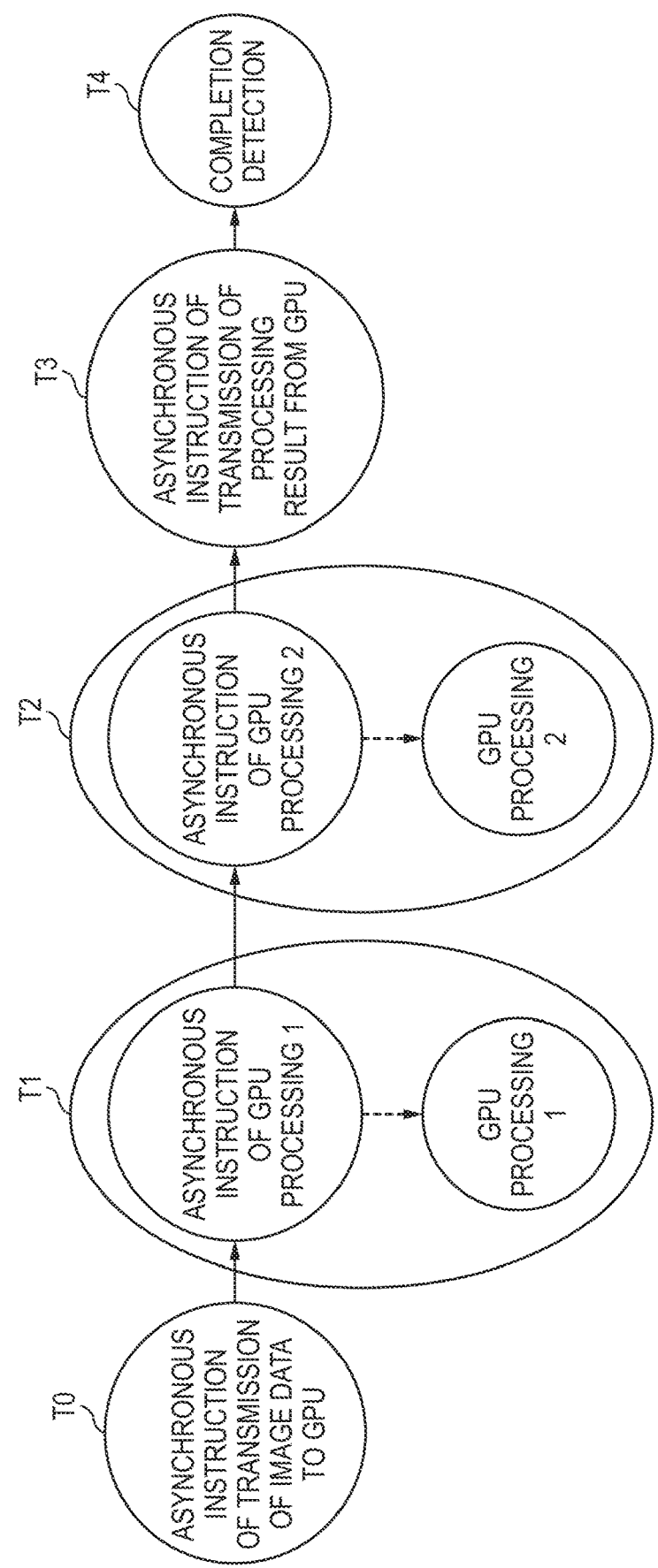
[FIG. 10C]

IMAGE PROCESSING DEVICE, IMAGE PROCESSING METHOD, AND NON-TRANSITORY COMPUTER READABLE MEDIUM FOR IMAGE PROCESSING

CROSS-REFERENCE TO RELATED APPLICATIONS

This application is based on and claims priority under 35 U.S.C. § 119 from Japanese Patent Application No. 2016-60525 filed on Mar. 24, 2016.

BACKGROUND

Technical Field

The present disclosure relates to an image processing device, an image processing method, and a non-transitory computer readable medium for image processing.

SUMMARY

According to an aspect of the present invention, there is provided an image processing device that executes image processing by each object of an object group in which plural objects are connected to each other in a directed acyclic graph form. The image processing device includes: a division unit that divides image data as an image processing target into division image data having a first size; a subdivision unit that subdivides the division image data into subdivision image data having a second size smaller than the first size for each partial processing which is image processing to be performed on the division image data, the division image data corresponding to the partial processing which is determined as executable processing based on a pre-and-post dependency relationship; and a control unit that performs control for causing plural computation devices to execute subdivision partial processing which is image processing to be performed on the subdivision image data, in parallel.

According to an aspect of the present invention, it is possible to realize parallel processing with improved processing efficiency in image processing, as compared with a case where partial processing corresponding to division image data obtained by dividing image data as a target of image processing is executed in parallel by plural computation devices.

According to another aspect of the present invention, it is possible to suppress an increase in overhead required for an execution of processing, as compared with a case where the computation device, which executes partial processing by using only a memory included in the own computation device, among the plural computation devices, executes the subdivision partial processing corresponding to the subdivision image data.

BRIEF DESCRIPTION OF THE DRAWINGS

Exemplary embodiment of the present invention will be described in detail based on the following figures, wherein:

FIG. 1 is a block diagram illustrating an example of a configuration of a computer that functions as an image processing device according to an embodiment;

FIG. 2A is a schematic diagram illustrating an example of an image processing DAG;

FIG. 2B is a schematic diagram illustrating an example of a case where an input/output memory is added to the image processing DAG;

FIG. 3 is a block diagram illustrating an example of a functional configuration of a processing control unit according to the embodiment;

FIG. 4 is a schematic diagram for explaining an example of division processing of an input image;

FIG. 5 is a schematic diagram illustrating an example of an image processing DAG in which an image processing module is divided into partial processing;

FIG. 6 is a flowchart illustrating a flow of DAG configuration/execution processing according to an embodiment;

FIG. 7 is a flowchart illustrating a flow of task storing processing according to an embodiment;

FIG. 8 is a schematic diagram for explaining execution processing of image processing according to an embodiment;

FIG. 9 is a flowchart illustrating a flow of task execution processing according to an embodiment;

FIG. 10A is a schematic diagram illustrating an example of a flow of processing in a case where two tasks as GPU processing are sequentially performed;

FIG. 10B is a schematic diagram illustrating an example of a flow of processing in a case where a second computation unit (GPU) performs processing in synchronization with a core of a first computation unit; and FIG. 10C is a schematic diagram illustrating an example of a flow of processing in a case where the second computation unit (GPU) performs processing asynchronously with the core of the first computation unit.

DETAILED DESCRIPTION

Hereinafter, exemplary embodiments according to the present invention will be described in detail with reference to the drawings.

First, a configuration of a computer 10 that functions as an image processing device will be described referring to FIG. 1. The computer 10 may be a copier, a printer, a facsimile machine, a multifunctional machine having the functions of these devices, or a computer incorporated in an image handling device such as a scanner that performs image processing. In addition, the computer may be an independent computer such as a personal computer (PC), and may be a computer incorporated in a portable device such as a personal digital assistant (PDA) or a mobile phone.

As illustrated in FIG. 1, the computer 10 according to the present exemplary embodiment includes a first computation unit 12A, a second computation unit 12B, a memory 14, a display unit 16, an operation unit 18, a storage unit 20, an image data supply unit 22, and an image output unit 24. In addition, each unit of the first computation unit 12A, the second computation unit 12B, the memory 14, the display unit 16, the operation unit 18, the storage unit 20, the image data supply unit 22, and the image output unit 24 are connected to each other via a bus 26.

The first computation unit 12A according to the present exemplary embodiment is a main processor of the computer 10, and is a central processing unit (CPU) including plural processor cores 13 (hereinafter, referred to as "cores 13") as an example. Each of the cores 13 is an example of a computation device that executes image processing. In the following description, in a case of distinguishing each of the cores 13, as in the core 13A and the core 13B, an alphabet is added to the end of the reference numeral 13.

In addition, the second computation unit 12B according to the present exemplary embodiment is a graphics processing unit (GPU) including a local memory 15 as an example. The second computation unit 12B includes an internal memory such as the local memory 15, is not particularly limited as long as the second computation unit is a computation device that performs image processing on image data stored in the internal memory, and may be, for example, a CPU. In addition, the second computation unit 12B may be a GPU incorporated in the first computation unit 12A. In addition, the first computation unit 12A and the second computation unit 12B may be a computation device such as a field programmable gate array (FPGA).

The memory 14 is nonvolatile storage means for temporarily storing data by the first computation unit 12A. In a case where image processing is performed by the second computation unit 12B according to the present exemplary embodiment, the first computation unit 12A transmits the image data stored in the memory 14 or a storage area of the storage unit 20 to the second computation unit 12B via the bus 26. The second computation unit 12B stores the image data transmitted from the first computation unit 12A in the local memory 15, and performs image processing on the stored image data.

In a case where the computer 10 is incorporated in the image handling device, as the display unit 16 and the operation unit 18, for example, a display panel such as a liquid crystal display (LCD), a ten key, and the like, which are provided on the image handling device, may be used. In a case where the computer 10 is an independent computer, as the display unit 16 and the operation unit 18, for example, a display, a keyboard, a mouse, and the like, which are connected to the computer 10, may be used. In addition, the display unit 16 and the operation unit 18 may be a touch panel display or the like formed by integrating a touch panel and a display. In addition, as the storage unit 20, a nonvolatile storage medium such as a hard disk drive (HDD), a solid state drive (SSD), or a flash memory may be used.

The image data supply unit 22 may be any device as long as the image data supply unit supplies image data as a processing target. For example, an image reading unit that reads an image recorded on a recording material such as paper or a photographic film and outputs image data may be used. In addition, as the image data supply unit 22, for example, a receiving unit that receives image data from an external device via a communication line and an image storage unit (the memory 14 or the storage unit 20) that stores image data may be used.

The image output unit 24 may be any device as long as the image output unit outputs image data subjected to image processing or an image represented by image data subjected to image processing. For example, as the image output unit, an image recording unit that records an image represented by image data on a recording material such as paper or a photosensitive material may be used. In addition, as the image output unit 24, a display unit (the display unit 16) that displays an image represented by image data on a display or the like or a writing device that writes image data on a recording medium such as a compact disk read only memory (CD-ROM) may be used. In addition, as the image output unit 24, a transmission unit that transmits image data subjected to image processing to an external device via a communication line may be used. In addition, the image output unit 24 may be an image storage unit (the memory 14 or the storage unit 20) that stores image data subjected to image processing.

As illustrated in FIG. 1, the storage unit 20 stores various programs to be executed by the first computation unit 12A and the second computation unit 12B. The storage unit 20 stores programs of an operating system 30, as various programs, the programs including a program for resource management, a program for program execution management, a program for communication between the computer 10 and an external device, and the like. In addition, the storage unit 20 stores an image processing program group 34 for causing the computer 10 to function as an image processing device, as various programs. In addition, the storage unit 20 stores a various-application-program group 32 (hereinafter, referred to as an "application 32") for causing the image processing device to perform desired image processing, as various programs.

The image processing program group 34 includes a program developed for a purpose of reducing a load when developing an image processing program to be executed by the image handling device, the portable device, the PC, and the like. In addition, the image processing program group 34 includes a program developed so as to be commonly executed on various kinds of devices (platforms) such as the image handling device, the portable device, the PC, and the like.

The image processing device realized by the image processing program group 34 configures an image processing DAG 50A (to be described in detail) that performs image processing instructed by the application 32, according to a configuration instruction from the application 32. The image processing device executes processing of the image processing DAG 50A according to an execution instruction from the application 32. In this manner, the image processing program group 34 provides an interface for the application 32, the interface instructing a configuration of the image processing DAG 50A that performs desired image processing or instructing an execution of image processing by the configured image processing DAG 50A.

With the configuration, even in a case of newly developing a certain device that needs to perform image processing internally, for development of a program that performs the image processing, an application 32, which causes the image processing program group 34 to perform the image processing required in the certain device, may be developed by using the interface. Therefore, a developer does not need to newly develop a program that actually performs image processing, and thus a load of the developer is reduced.

Next, the image processing program group 34 according to the present exemplary embodiment will be described in detail. As illustrated in FIG. 1, the image processing program group 34 includes a module library 36, a program functioning as a processing configuration unit 42, and a program functioning as a processing control unit 46.

In the module library 36, programs of plural types of image processing modules 38 that perform predetermined image processing different from each other are registered. Examples of the image processing include, for example, input processing, filter processing, color conversion processing, enlargement processing and reduction processing (denoted as "enlargement/reduction processing" in FIG. 1), skew angle detection processing, image rotation processing, image synthesis processing, output processing, and the like.

In addition, in the module library 36, image processing modules 38 having the same image processing type and different image processing contents to be executed are also registered. In FIG. 1, the image processing modules are distinguished from each other by adding numbers at the ends, as in "module 1", "module 2", and the like. For example, as the image processing module 38 that performs the enlargement/reduction processing, an image processing module 38 that performs processing of reducing horizontal and vertical sizes of an image to 50% by thinning-out input image data for each one pixel in each direction of a horizontal direction and a vertical direction, is prepared. Further, for example, as the image processing module 38 that performs enlargement/reduction processing, an image processing module 38 that performs enlargement/reduction processing of input image data at a specified enlargement/reduction ratio, is prepared.

In addition, for example, as the image processing module 38 that performs color conversion processing, an image processing module 38 that converts an image in a red, green, and blue (RGB) color space into an image in a cyan, magenta, yellow, and key-plate (black) (CMYK) color space, and an image processing module 38 that converts an image in a CMYK color space into an image in an RGB color space are prepared. Further, for example, as the image processing module 38 that performs color conversion processing, an image processing module 38 that converts an image in an RGB color space into an image in an YCbCr color space and an image processing module 38 that converts an image in an YCbCr color space into an image in an RGB color space are prepared.

In addition, in the module library 36, a buffer module 40 including a storage area (buffer) for storing image data is also registered.

According to an instruction from the application 32, the processing configuration unit 42 according to the present exemplary embodiment configures the image processing DAG 50A in a DAG form. As illustrated in FIG. 2A, in the image processing DAG 50A, as an example, one or more image processing modules 38 are connected to each other via the buffer module 40 disposed in at least one of a pre-stage and a post-stage of each of the image processing modules 38.

Each of the image processing modules 38 is an example of an object that executes image processing on input image data. In addition, in an example illustrated in FIG. 2A, for the image processing module 38 connected to the pre-stage image processing module 38 via the buffer module 40, in a case where image processing by the pre-stage image processing module 38 is completed, image processing by the image processing module 38 can be executed. In addition, in the example illustrated in FIG. 2A, for the image processing module 38 connected to the plural pre-stage image processing modules 38 via the buffer modules 40, in a case where all image processing by the plural pre-stage image processing modules 38 is completed, image processing by the image processing module 38 can be executed.

In addition, FIG. 2A illustrates a DAG in which only the modules are connected to each other in order of processing. On the other hand, when the DAG is executed, as illustrated in FIG. 2B, input image data stored in the memory 14 is input, and the image processing is performed according to the DAG. A processing result such as output image data subjected to the processing is finally stored in the memory 14.

Next, a functional configuration of the processing control unit 46 according to the present exemplary embodiment will be described with reference to FIG. 3. As illustrated in FIG. 3, the processing control unit 46 includes a division unit 60, a subdivision unit 61, a control unit 62, a task queue 64, and an output unit 66.

The division unit 60 according to the present exemplary embodiment divides image data, which is a target of image processing (hereinafter, "a target of image processing" is simply referred to as a "processing target") among the input image data, into plural division image data having a first size. In the present exemplary embodiment, as a specific example, an image represented by a portion, which is a processing target of the input image data, is divided into plural partial areas (hereinafter, referred to as "division images"). As illustrated in FIG. 4, as an example, the division unit 60 divides an image G represented by a portion, which is a processing target of the input image data, into plural (in the example illustrated in FIG. 4, three) division images B1 to B3 according to the first size. In image processing such as color conversion processing in which the entire input image is a processing target, a portion which is a processing target of the input image data means a portion in which the entire input image data is a processing target. In addition, in image processing such as clipping (trimming) processing in which a portion of the input image is a processing target, a portion which is a processing target of the input image data means a portion of the input image. In the following description, in order to avoid confusion, the portion which is a processing target of the input image data is simply referred to as "input image data".

In addition, in an example illustrated in FIG. 4, although the division unit 60 divides the image G vertically when viewed from the front, the invention is not limited thereto. For example, the division unit 60 may divide the image G horizontally when viewed from the front, or divide the image G vertically and horizontally when viewed from the front.

In the present exemplary embodiment, the first size by which the division unit 60 divides the input image data is set to a value obtained by dividing a capacity of a cache memory, which is at the farthest level from a processor of the computation unit that executes the image processing by the image processing module 38, that is, a so-called last level cache (LLC) by the number of tasks T (to be described in detail) stored in the task queue 64 (rounded down to the decimal point). The first size is not limited to the present exemplary embodiment. On the other hand, preferably, the first size is set to be equal to or greater than a value obtained by dividing a capacity of a cache memory other than the LLC that is provided for each core 13 by the number of tasks T stored in the task queue 64, and is set to be equal to or less than a value obtained by dividing a capacity of the LLC by the number of tasks T stored in the task queue 64.

The subdivision unit 61 according to the present exemplary embodiment divides the division image data into subdivision image data having a second size. In the present exemplary embodiment, as a specific example, the subdivision unit 61 further divides (subdivides) the division image. As illustrated in FIG. 4, as an example, the subdivision unit 61 subdivides the division images B1 to B3 into plural (in the example illustrated in FIG. 4, two on each division image, a total of six) subdivision images C11 to C32 according to the second size. Therefore, a task of the subdivision image data having the second size (task t to be described) is a fine degree task, and a task of the division image data having the first size (task T to be described) is a medium degree task.

The second size by which the subdivision unit 61 divides the input image data is smaller than the first size. In the present exemplary embodiment, the second size is set to a value equal to or less than a capacity of a cache memory, which is at the closest level to the processor of the computation unit that executes image processing by the image processing module 38, that is, a so-called level 1 (L1) cache.

The control unit 62 according to the present exemplary embodiment performs a control causing the plural cores 13 to execute tasks corresponding to the subdivision image data in parallel. Here, the term "parallel" means that tasks, which can be executed based on a dependency relationship, are executed in parallel (simultaneously) by the plural cores 13.

Specifically, as illustrated in FIG. 5, as an example, the control unit 62 divides the image processing to be executed by each image processing module 38 of the image processing DAG 50A into partial processing 39 corresponding to each of the division image data (division image data divided by the division unit 60), and updates the image processing DAG 50A to an image processing DAG 50B. The image processing DAG 50B represents a DAG of a task of each partial processing 39, and is a so-called task DAG.

FIG. 5 illustrates the image processing DAG 50B in a case where the input image data of the image processing DAG 50A illustrated in FIG. 2A is divided into four pieces of division image data. In FIG. 5, in order to avoid confusion, the buffer module 40 is not illustrated.

According to the type of the image processing executed by the image processing module 38, the control unit 62 according to the present exemplary embodiment imparts a dependency relationship between the partial processing 39 of the image processing module 38 connected to the pre-stage and the partial processing 39 of the image processing module 38 connected to the post-stage. In FIG. 5, the dependency relationship is indicated by a broken-line arrow.

For example, as in color conversion processing, in processing of performing image processing on only pixels as processing targets, the control unit imparts a one-to-one dependency relationship to each partial processing 39. On the other hand, for example, as in filter processing, in image processing in which pixels adjacent to the pixels as processing targets are also required, the control unit also imparts a dependency relationship to the pre-stage partial processing 39 which performs image processing on the adjacent pixels. That is, the dependency relationship is a relationship between the image processing modules 38 connected to each other, in which the partial processing of the image processing module 38 connected to the post-stage can be executed in a case where the partial processing 39 of the image processing module 38 connected to the pre-stage is completed. Therefore, each partial processing 39 can be executed in a case where there is no pre-stage partial processing 39 to which a dependency relationship is imparted, or in a case where all of pre-stage partial processing 39 to which a dependency relationship is imparted are completed.

Specifically, for example, the partial processing 39A and the partial processing 39B illustrated in FIG. 5 can be executed when starting an execution of image processing. In addition, for example, the partial processing 39C illustrated in FIG. 5 can be executed when both of the pre-stage partial processing 39A and the pre-stage partial processing 39B to which a dependency relationship is imparted are completed.

In the present exemplary embodiment, the partial processing 39 corresponding to the division image data is referred to as a "task T". In addition, subdivision partial processing corresponding to the subdivision image data is referred to as a "task t". Further, the task T and the task t are simply referred to as a "task" when generically described without discrimination. For convenience of explanation, in the following description, a fact that the division image data corresponding to the task T is subdivided into the subdivision image data corresponding to the task t is referred to as a fact that "the task T is subdivided into the task t".

The control unit 62 stores the executable task T in the task queue 64 from which each of the plural cores 13 sequentially reads and executes the stored tasks. As an example, the number of the tasks T, which are simultaneously stored in the task queue 64 by the control unit 62 according to the present exemplary embodiment, is set to two or less. The number of the tasks T which are simultaneously stored in the task queue 64 is not limited to the present exemplary embodiment, and preferably, is set to two or more. In a case where only one task T is stored in the task queue 64 and a new task T is not stored in the task queue 64 until an execution of the task T is completed, when there is one task t of which an execution is not completed among plural tasks t obtained by subdividing the task T, a new task T is not stored in the task queue 64. In this case, among the plural cores 13, the number of cores 13 which do not operate increases, and as a result, an operation rate of the cores 13 decreases. On the other hand, in a case where the number of the tasks T that can be simultaneously stored in the task queue 64 is not limited, in pre-processing (to be described in detail), the memory is reserved for all tasks T stored in the task queue 64, and as a result, a capacity of the memory that is reserved is increased. For this reason, by limiting the number of the tasks T that can be simultaneously stored in the task queue 64, it is possible to suppress an increase in an amount of a resource such as the memory that is reserved in pre-processing. Therefore, the number of the tasks T that can be simultaneously stored in the task queue 64 may be determined according to the capacity of the memory or the like, or may be changed according to the operation rate of the cores 13.

Further, the control unit 62 stores the task t corresponding to the subdivision image data which is subdivided by the subdivision unit 61, in the task queue 64.

Under the control of the control unit 62, the output unit 66 according to the present exemplary embodiment outputs output image data obtained by executing the image processing by the image processing module 38 which is at the final stage of the image processing DAG 50B. In the present exemplary embodiment, the output unit 66 displays an output image represented by the obtained output image data, on the display unit 16. The output unit 66 may output (transmit) the output image data to an external device. In addition, in a case where the computer 10 is incorporated in a printer, the output unit 66 may output (form) an output image represented by the output image data on a recording material such as paper.

Next, an operation of the computer 10 according to the present exemplary embodiment will be described with reference to FIGS. 6 to 10. FIG. 6 is a flowchart illustrating a flow of DAG configuration/execution processing that is executed by the first computation unit 12A in a case where an instruction to start an execution of image processing is input by the application 32. A program for the DAG configuration/execution processing (DAG configuration/execution processing program) is installed in the storage unit 20 in advance. In addition, any task is not executed in the first computation unit 12A, and the core 13 capable of executing a task executes the DAG configuration/execution processing program. Thus, the program functions as the processing configuration unit 42 and the control unit 62.

In step 100 of FIG. 6, the processing configuration unit 42 configures an image processing DAG 50A that performs image processing instructed by the application 32, according to a configuration instruction from the application 32. In addition, the processing configuration unit 42 updates the image processing DAG 50A to the image processing DAG 50B as described above. In the present exemplary embodiment, at this time, information representing the second size for subdividing each task T is added.

In the next step 102, the control unit 62 and the processing configuration unit 42 cause the first computation unit 12A (core 13) and the second computation unit 12B to execute image processing by the image processing DAG 50B configured in step 100. After the execution processing of the image processing DAG is executed, the DAG configuration/execution processing is completed.

By executing the DAG configuration/execution processing, a result of the image processing desired by the application 32 is obtained from the output unit 66. In the present exemplary embodiment, in a case where the DAG configuration/execution processing is completed, the control unit 62 notifies the application 32 of information representing that the processing is completed. Alternatively, in a case where any error occurs during the processing, the control unit 62 notifies the application 32 of information representing occurrence of an error.

Next, in step 102 of the DAG configuration/execution processing, execution processing of the image processing DAG will be described in detail. The DAG configuration/execution processing according to the present exemplary embodiment includes two pieces of processing including task storing processing of storing an executable task T of the image processing DAG 50B in the task queue 64 and task execution processing of executing a task stored in the task queue 64.

First, task storing processing will be described with reference to FIG. 7. FIG. 7 is a flowchart illustrating a flow of task storing processing. In the present exemplary embodiment, a program for the task storing processing (a task storing processing program) is installed in the storage unit 20 in advance as a part of the DAG configuration/execution processing program or a so-called subprogram.

In addition, any task is not executed in the first computation unit 12A, and the core 13 capable of executing a task executes the task storing processing program. Thus, the program functions as the control unit 62, and the task storing processing illustrated in FIG. 7 is executed.

In step 110 of FIG. 7, the control unit 62 determines whether or not an executable task T is stored in the task queue 64. At this time, even when a task (a task t in the present exemplary embodiment) other than the task T is stored in the task queue 64, the task is not involved in the determination. In the present exemplary embodiment, in a case where the number of executable tasks T stored in the task queue 64 is two or more, the control unit 62 determines that the determination result is Yes, and proceeds to step 114.

On the other hand, in a case where the number of executable tasks T stored in the task queue 64 is less than two, the control unit 62 determines that the determination result in step 110 is No, and proceeds to step 112.

In step 112, the control unit 62 retrieves an executable task from the image processing DAG 50B, and stores the executable task in the task queue 64. An example illustrated in FIG. 8 illustrates a state where an executable task T (hatched) of the image processing DAG 50B is stored in the task queue 64.

At this time, as described above, the number of the tasks T stored in the task queue 64 may be two or less, and in step 112, the number of the tasks T simultaneously stored in the task queue 64 by the control unit 62 may be one or two. Specifically, in a case where there is no task T stored in the task queue 64, the control unit 62 may store one task T or two tasks T, and in a case where one task T is stored in the task queue 64, one task T may be stored in the task queue 64.

In step 112, the number of the tasks T to be simultaneously stored in the task queue 64 by the control unit 62 may be determined in advance, or may be changed according to progress of task processing in each core 13.

In the next step 114, the control unit 62 determines whether or not all of the tasks T of the image processing DAG 50B are stored in the task queue 64. In a case where there is a task T which is not yet stored in the task queue 64, the control unit 62 determines that the determination result is No, returns to step 110, and repeats the task storing processing. On the other hand, in a case where all of the tasks T are stored in the task queue 64, the control unit 62 determines that the determination result is Yes, and ends the task storing processing.

Next, task execution processing will be described with reference to FIG. 9. FIG. 9 is a flowchart illustrating a flow of task execution processing. In the present exemplary embodiment, a program for the task execution processing (a task execution processing program) is installed in the storage unit 20 in advance as a part of the DAG configuration/execution processing program or a so-called subprogram.

Any task is not executed in the first computation unit 12A, and each core 13 capable of executing a task executes the task execution processing program. Thus, the program functions as the control unit 62, and the task execution processing illustrated in FIG. 9 is executed. In the present exemplary embodiment, the task storing processing and the task execution processing are executed by the different cores 13, and thus the task storing processing and the task execution processing are executed in parallel.

In step 120 of FIG. 9, the control unit 62 acquires a task from the task queue 64. Here, the acquired task may be a task T or another task (in the present exemplary embodiment, a task t).

In the next step 122, the control unit 62 determines whether or not the acquired task is a task T. In a case where the acquired task is a task T, the control unit 62 determines that the determination result is Yes, and proceeds to step 118.

In step 124, the control unit 62 executes pre-processing predetermined in an execution of the task T, and then proceeds to step 126. The pre-processing which is executed in step 124 is processing which is determined in advance so as to be performed before image processing, and is not particularly limited. For example, the pre-processing is processing of reserving an output buffer area for storing image processing results, or processing of reserving computation resources such as initialization of variables for image processing.

On the other hand, in step 122, in a case where the acquired task is not a task T, that is, in a case where the acquired task is a task t in the present exemplary embodiment, the control unit 62 determines that the determination result is No, and proceeds to step 126.

In step 126, the control unit 62 determines whether or not the task acquired in step 120 can be subdivided.

In the present exemplary embodiment, in a case of a task that executes image processing by the second computation unit 12B, subdivision by the subdivision unit 61 is not performed. In a case where a task is executed by the second computation unit 12B, as compared with a case where a task is executed by the first computation unit 12A, processing which is added as overhead, such as transmission of image data to the local memory 15 or activation of the second computation unit 12B, increases. The overhead occurs for each task, and as a result, in a case where a task T is subdivided into tasks t, the overhead increases corresponding to an increase in the number of the tasks. For this reason, in the present exemplary embodiment, for the task T which is executed by the second computation unit 12B, image processing is executed while maintaining the task T without subdivision. Therefore, in a case where the task T is a task to be executed by the second computation unit 12B, subdivision is disabled in the image processing. Information representing whether or not the task T is a task to be executed by the second computation unit 12B is imparted when the processing configuration unit 42 generates the image processing DAG 50B from the image processing DAG 50A in step 100 (refer to FIG. 6) of the DAG configuration/execution processing.

In addition, in the present exemplary embodiment, even in a case where the size of the image data (division image data or subdivision image data) corresponding to the acquired task is equal to or smaller than the size of the subdivision image data corresponding to the task t, subdivision is disabled.

On the other hand, in a case where the acquired task is a task to be executed by the core 13 of the first computation unit 12A and the size of the image data (division image data or subdivision image data) corresponding to the acquired task is equal to or larger than the size of the subdivision image data corresponding to the task t (in the present exemplary embodiment, in a case where the size of the image data corresponding to the acquired task is a size of the division image data corresponding to the task T), subdivision is possible.

In this manner, in the present exemplary embodiment, specifically, in a case where the acquired task is a task T and the task is executed by the first computation unit 12A, the task can be subdivided. Thus, the control unit 62 determines that the determination result in step 126 is Yes, and proceeds to step 128.

In step 128, the subdivision unit 61 divides the task (task T in the present exemplary embodiment) into tasks t by the second size. The subdivision unit 61 according to the present exemplary embodiment subdivides the task acquired in step 120 into tasks t. In the example illustrated in FIG. 8, a case where the core 13C subdivides the task T into three tasks t is illustrated. As described above, in the present exemplary embodiment, as an example, all of the tasks T are subdivided into tasks t, and thus plural tasks t are obtained.

In the next step 130, the control unit 62 stores all of the tasks t obtained by the subdivision in the task queue 64, and then returns to step 120.

On the other hand, in a case where subdivision is disabled as described above in step 126, the control unit determines that the determination result is No, and proceeds to step 132.

In step 132, the control unit 62 causes the core 13 of the first computation unit 12A or the second computation unit 12B to execute the task. In a case where the task T is to be executed by the second computation unit 12B, the core 13 of the first computation unit 12A performs processing of causing the second computation unit 12B to execute the task T, and thus the task T is executed by the second computation unit 12B.

In the next step 134, the control unit 62 determines whether or not the task executed in step 132 is the last task t. Specifically, the control unit 62 determines whether or not the task executed in step 132 is a task t and tasks t of the same task T as a subdivision source are not stored in the task queue 64, that is, whether or not all of the tasks t are executed.

In a case where the executed task is not the last task t, the control unit 62 determines that the determination result is No, and returns to step 120. On the other hand, in a case where the executed task is the last task t, the control unit 62 determines that the determination result is Yes, and proceeds to step 136.

In step 136, the control unit 62 performs post-processing.

The post-processing executed in step 136 is processing which is predetermined to be performed after the partial processing corresponding to the task T, and is not particularly limited. For example, the post-processing is processing of releasing computation resources reserved in the processing of step 124.

In the next step 138, the task queue 64 notifies the processing configuration unit 42 of completion of the task T, and then the task execution processing is ended. When receiving completion notification of the task T, the processing configuration unit 42 updates the dependency relationship of the image processing DAG 50B. As described above, when the dependency relationship of the image processing DAG 50B is updated, in the task storing processing (refer to FIG. 7), the processing configuration unit 42 determines an executable task T based on the updated dependency relationship.

In a case where the task T is a task T to be executed by the second computation unit 12B, processing is performed at a high speed. Thus, generally, data (image data) required for processing is transmitted to the local memory 15 of the second computation unit 12B, and is processed. In the following description, a case where the second computation unit 12B is a GPU will be described as a specific example. As an example, as illustrated in FIG. 10A, in a case where tasks T1 and T2 as GPU processing are sequentially performed, as illustrated in an example of FIG. 10B, transmission processing of the image data from the memory 14 to the local memory 15 of the second computation unit 12B is performed before an execution of the task T1, and transmission processing of a processing result from the local memory 15 to the memory 14 is performed after an execution of the task T2. Because the transmission processing is performed by direct memory access (DMA) transmission or the like under the control of the core 13, when a processing unit becomes small, the number of times of DMA transmission increases, and as a result, a transmission rate decreases. In addition, because GPU activation is performed in a small unit, overhead due to a control of the GPU also increases, and as a result, processing performance is degraded. Therefore, by setting the size of the division image data of the task T to be executed by the GPU to be equal to or larger than the first size, subdivision of the task T is not performed as described above.

As described above, the core 13 instructs the CPU to execute the task T, and thus the GPU is activated and controlled. Thereby, the task T is executed by the GPU. In a case of synchronization processing illustrated in FIG. 10B as an example (in a case where the control is not returned to the core 13 until processing in the GPU is completed), a task is configured in the same way as the task T to be executed by a normal CPU. On the other hand, during a period from GPU processing 1 to GPU processing 2 in FIG. 10B, the core 13 is in a standby state until the processing is completed, and as a result, an unnecessary operation of the core 13 is performed.

In a case of asynchronous processing illustrated in FIG. 10C as an example (in a case where the core 13 instructs the GPU to execute processing and the control is returned to the core 13 without waiting for completion of the processing), the core 13 can execute another task in parallel with the execution of the GPU processing 1 and the GPU processing 2, and thus the operation rate is improved. In the case of asynchronous processing, it is necessary to detect completion of the task (tasks T1 and T2 in FIG. 10C) executed by the GPU. For this reason, as illustrated in FIG. 10C, the core 13 executes an instruction such that each of transmission of the image data to the GPU, processing of the image data, and transmission of a processing result from the GPU (tasks T0 to T3) is asynchronously performed. When the control is returned to the core 13, the core 13 executes a task T4 for detecting completion of the task in the GPU, and inputs the completion detection task T4 into the task queue 64 in a case where completion of the task is not detected. The core 13 reads another task different from the task T4 from the task queue 64, and performs processing. Thereby, the standby state described with reference to FIG. 10B as an example does not exist, and thus an unnecessary operation of the core 13 is suppressed.

For the task T executed by the GPU, by setting a processing time on the GPU and a transmission time from the memory 14 to the local memory 15 or a transmission time from the local memory 15 to the memory 14 to be the same (including an error), the transmission time is reduced. Thus, it is possible to further improve performance such as a processing speed.

As described above, the computer 10 according to the present exemplary embodiment is a computer 10 that executes image processing by each object of an object group in which plural objects for executing the image processing are connected in a directed acyclic graph form. The computer 10 includes a division unit 60 that divides image data as an image processing target into division image data having a first size, a subdivision unit 61 that subdivides the division image data into subdivision image data having a second size smaller than the first size for each partial processing which is image processing to be performed on the division image data, the division image data corresponding to the partial processing which is determined as executable processing based on a pre-and-post dependency relationship, and a control unit 62 that performs control for causing plural first computation units 12A (cores 13) and a second computation unit 12B to execute subdivision partial processing which is image processing to be performed on the subdivision image data, in parallel.

As described above, the computer 10 according to the present exemplary embodiment executes a task T corresponding to the division image data obtained by dividing the image data by the first size larger than the second size, and thus overhead due to parallel processing is reduced. In addition, the computer 10 executes a task t corresponding to the subdivision image data obtained by subdividing the division image data by the second size. Thereby, the operation rate of the cores 13 and the second computation unit 12B is improved. Further, a required amount of data is prevented from being increased, and thus cache mishit also hardly occurs.

Therefore, according to the computer 10 of the present exemplary embodiment, it is possible to realize parallel processing with improved processing efficiency in image processing, so-called improved scalability.

In the present exemplary embodiment, of course, it is necessary to perform each processing of updating the image processing DAG 50B, storing the task in the task queue 64, and reading the task from the task queue 64 while exclusively controlling each processing.

In the present exemplary embodiment, in step 134 (refer to FIG. 9) of the task execution processing, in advance, all of the tasks T are subdivided into the plurality of tasks t in step 128 and the subdivided tasks are stored in the task queue 64, and whether or not the task t is the last task is determined based on the presence or absence of the tasks t stored in the task queue 64. On the other hand, the determination method is not limited thereto. For example, when a counter including a shared pointer shared by each core 13 is associated with the task T and an initial value of the counter is set to 0, in a case where one task t is subdivided from the task T (or in a case where one task t is stored in the task queue 64), the counter is incremented by 1, and in a case where an execution of the task t is completed (or in a case where the task t is read from the task queue 64), the counter is decremented. Thus, in a case where the value of the counter becomes 0, it may be determined that the task t is the last task.

In the present exemplary embodiment, although a case where the second computation unit 12B is included in the computer 10 is described, the second computation unit 12B may be provided outside the computer 10, or may be provided in a computer different from the computer 10.

In addition, in the above-described embodiment, although a mode in which various programs are stored (installed) in the storage unit 20 in advance is described, the present invention is not limited thereto. The various programs may be provided by being recorded on a recording medium such as a CD-ROM, a digital versatile disk read only memory (DVD-ROM), or a universal serial bus (USB) memory. In addition, various programs may be downloaded from an external device via a network.

While various exemplary embodiments have been described above, these embodiments may be combined with each other as appropriate.

In addition, the present disclosure is not limited to each of the above-described embodiments, and can be freely modified in various forms without departing from the spirit of the present disclosure.

This application is based upon and claims the benefit of priority from Japanese Patent Application No. 2016-060525 filed on Mar. 24, 2016, the entire contents of which are incorporated herein by reference.

REFERENCE SIGNS LIST

10: COMPUTER
12A: FIRST COMPUTATION UNIT
12B: SECOND COMPUTATION UNIT
13, 13A to 13C: CORE
14: MEMORY
15: LOCAL MEMORY
16: DISPLAY UNIT
18: OPERATION UNIT
20: STORAGE UNIT
22: IMAGE DATA SUPPLY UNIT
24: IMAGE OUTPUT UNIT
26: BUS
30: OPERATING SYSTEM
32: APPLICATION PROGRAM GROUP (APPLICATION PROGRAM)
34: IMAGE PROCESSING PROGRAM GROUP
36: MODULE LIBRARY
38: IMAGE PROCESSING MODULE
39, 39A to 39C: PARTIAL PROCESSING
40: BUFFER MODULE
42: PROCESSING CONFIGURATION UNIT
46: PROCESSING CONTROL UNIT
50A, 50B: IMAGE PROCESSING DAG
60: DIVISION UNIT

61: SUBDIVISION UNIT
62: CONTROL UNIT
64: TASK QUEUE
66: OUTPUT UNIT
B1 to B3, C11 to C32: DIVISION IMAGE
G: IMAGE
T, t: TASK

The invention claimed is:

1. An image processing device that executes image processing by each object of an object group in which a plurality of objects are connected to each other in a directed acyclic graph form, the image processing device comprising:
   a device memory;
   a central processing unit (CPU) comprising a plurality of processor cores; and
   a graphics processing unit (GPU) comprising an internal memory, the GPU being configured to perform image processing on image data stored in the internal memory,
   wherein the CPU is configured to execute:
      a division unit configured to divide image data as an image processing target into division image data having a first size;
      a subdivision unit configured to subdivide the division image data into subdivision image data having a second size smaller than the first size for each partial processing which is image processing to be performed on the division image data, the division image data corresponding to the partial processing which is determined as executable processing based on a pre-and-post dependency relationship; and
      a controller configured to perform control for causing a plurality of computation devices to execute subdivision partial processing which is image processing to be performed on the subdivision image data, in parallel,
   wherein the plurality of computation devices comprises the GPU and the plurality of processor cores of the CPU, and
   wherein the subdivision partial processing is disabled for the GPU.

2. The image processing device according to claim 1, wherein the controller is configured to perform control for causing the GPU to execute partial processing on the division image data instead of the subdivision image data.

3. The image processing device according to claim 2, wherein the first size is a size obtained based on a capacity of a cache memory, which is at a farthest level from the plurality of processor cores, among a plurality of cache memories to be used in an execution of the partial processing by the plurality of processor cores, and the number of the partial processing which can be stored in a task queue from which each of the plurality of processor cores sequentially reads and executes the stored partial processing.

4. The image processing device according to claim 3, wherein in response to the GPU being capable of executing the partial processing asynchronously with the CPU, the controller is configured to cause the CPU to execute an execution instruction task for instructing the GPU to execute the partial processing, and then cause the CPU to repeatedly execute a completion detection task for detecting completion of the partial processing in the GPU until the completion is detected.

5. The image processing device according to claim 2, wherein the second size is a size equal to or less than a capacity of a cache memory, which is at a level closer to the plurality of processor cores than a cache memory at a farthest level from the plurality of processor cores, among a plurality of cache memories to be used in an execution of the subdivision partial processing by the plurality of processor cores.

6. The image processing device according to claim 2, wherein in response to the GPU being capable of executing the partial processing asynchronously with the CPU, the controller is configured to cause the CPU to execute an execution instruction task for instructing the GPU to execute the partial processing, and then cause the CPU to repeatedly execute a completion detection task for detecting completion of the partial processing in the GPU until the completion is detected.

7. The image processing device according to claim 1, wherein the first size is a size obtained based on a capacity of a first cache memory, which is at a farthest level from the plurality of processor cores, among a plurality of cache memories to be used in an execution of the partial processing by the plurality of processor cores, and the number of the partial processing which can be stored in a task queue from which each of the plurality of processor cores sequentially reads and executes the stored partial processing.

8. The image processing device according to claim 7, wherein the second size is a size equal to or less than a capacity of a second cache memory, which is at a level closer to the plurality of processor cores devices than the first cache memory at the farthest level from the plurality of processor cores, among the plurality of cache memories to be used in an execution of the subdivision partial processing by the plurality of processor cores.

9. The image processing device according to claim 7, wherein in response to the GPU being capable of executing the partial processing asynchronously with the CPU, the controller is configured to cause the CPU to execute an execution instruction task for instructing the GPU to execute the partial processing, and then cause the CPU to repeatedly execute a completion detection task for detecting completion of the partial processing in the GPU until the completion is detected.

10. The image processing device according to claim 1, wherein the second size is a size equal to or less than a capacity of a cache memory, which is at a level closer to the plurality of processor cores than a cache memory at a farthest level from the plurality of processor cores, among a plurality of cache memories to be used in an execution of the subdivision partial processing by the plurality of processor cores.

11. The image processing device according to claim 1, wherein in response to the GPU being capable of executing the partial processing asynchronously with the CPU, the controller is configured to cause the CPU to execute an execution instruction task for instructing the GPU to execute the partial processing, and then cause the CPU to repeatedly execute a completion detection task for detecting completion of the partial processing in the GPU until the completion is detected.

12. A non-transitory computer readable medium storing a program causing a computer to execute a process for image processing, the process comprising: dividing, subdividing, and controlling in the image processing device according to claim 1.

13. A non-transitory computer readable medium storing a program causing a computer to execute a process for image processing, the process comprising: dividing, subdividing, and controlling in the image processing device according to claim 2.

14. A non-transitory computer readable medium storing a program causing a computer to execute a process for image processing, the process comprising: dividing, subdividing, and controlling in the image processing device according to claim 7.

15. A non-transitory computer readable medium storing a program causing a computer to execute a process for image processing, the process comprising: dividing, subdividing, and controlling in the image processing device according to claim 10.

16. A non-transitory computer readable medium storing a program causing a computer to execute a process for image processing, the process comprising: dividing, subdividing, and controlling in the image processing device according to claim 11.

* * * * *